United States Patent
Ording et al.

(10) Patent No.: US 7,812,826 B2
(45) Date of Patent: Oct. 12, 2010

(54) PORTABLE ELECTRONIC DEVICE WITH MULTI-TOUCH INPUT

(75) Inventors: Bas Ording, San Francisco, CA (US); Scott Forstall, Mountain View, CA (US); Greg Christie, San Jose, CA (US); Stephen O. Lemay, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 893 days.

(21) Appl. No.: 11/618,633

(22) Filed: Dec. 29, 2006

(65) Prior Publication Data

US 2007/0152984 A1 Jul. 5, 2007

Related U.S. Application Data

(60) Provisional application No. 60/755,366, filed on Dec. 30, 2005.

(51) Int. Cl.
*G06F 3/041* (2006.01)
(52) U.S. Cl. .................. 345/173; 345/156; 345/169
(58) Field of Classification Search ............. 345/173, 345/156, 169
See application file for complete search history.

(56) References Cited

U.S. PATENT DOCUMENTS

| | | | |
|---|---|---|---|
| 5,448,686 A | | 9/1995 | Borrel et al. ............. 395/120 |
| 5,483,261 A | | 1/1996 | Yasutake ................. 345/173 |
| 6,073,036 A | * | 6/2000 | Heikkinen et al. ....... 455/550.1 |
| 6,211,856 B1 | * | 4/2001 | Choi et al. .............. 345/666 |
| 6,278,443 B1 | * | 8/2001 | Amro et al. ............. 345/173 |
| 6,313,838 B1 | | 11/2001 | Deering ................. 345/420 |
| 6,950,539 B2 | * | 9/2005 | Bjorn et al. ............ 382/124 |
| 6,954,899 B1 | | 10/2005 | Anderson ............... 715/701 |
| 6,958,749 B1 | | 10/2005 | Matsushita et al. ....... 345/175 |
| 7,385,615 B2 | * | 6/2008 | Vale et al. .............. 345/660 |

(Continued)

FOREIGN PATENT DOCUMENTS

EP 0549944 A2 12/1992

(Continued)

OTHER PUBLICATIONS

Chen et al., "A novel navigation and transmission technique for mobile handheld devices," Technical Report CSE-2003-1, Department of Computer Science, University of California at Davis, 2003, 8 pages, http://www.cs.ucdavis.edu/research/tech-reports/2003/CSE-2003-1.pdf.

(Continued)

*Primary Examiner*—Bipin Shalwala
*Assistant Examiner*—Afroza Y Chowdhury
(74) *Attorney, Agent, or Firm*—Morgan, Lewis & Bockius LLP

(57) ABSTRACT

A portable communication device with multi-touch input detects one or more multi-touch contacts and motions and performs one or more operations on an object based on the one or more multi-touch contacts and/or motions. The object has a resolution that is less than a pre-determined threshold when the operation is performed on the object, and the object has a resolution that is greater than the pre-determined threshold at other times.

14 Claims, 11 Drawing Sheets

U.S. PATENT DOCUMENTS

| | | | | |
|---|---|---|---|---|
| 7,411,575 | B2* | 8/2008 | Hill et al. | 345/156 |
| 7,469,388 | B1* | 12/2008 | Baudisch et al. | 715/856 |
| 7,489,306 | B2* | 2/2009 | Kolmykov-Zotov et al. | 345/173 |
| 7,519,223 | B2* | 4/2009 | Dehlin et al. | 382/203 |
| 7,605,804 | B2* | 10/2009 | Wilson | 345/173 |
| 2002/0030699 | A1* | 3/2002 | Van Ee | 345/810 |
| 2004/0207653 | A1* | 10/2004 | Stavely et al. | 345/698 |
| 2005/0057524 | A1* | 3/2005 | Hill et al. | 345/173 |
| 2005/0195157 | A1* | 9/2005 | Kramer et al. | 345/156 |
| 2006/0022955 | A1 | 2/2006 | Kennedy | 345/173 |
| 2006/0026521 | A1* | 2/2006 | Hotelling et al. | 715/702 |
| 2006/0026535 | A1* | 2/2006 | Hotelling et al. | 715/863 |
| 2006/0026536 | A1* | 2/2006 | Hotelling et al. | 715/863 |
| 2006/0031786 | A1* | 2/2006 | Hillis et al. | 715/863 |
| 2006/0161870 | A1* | 7/2006 | Hotelling et al. | 715/863 |
| 2006/0161871 | A1* | 7/2006 | Hotelling et al. | 715/863 |
| 2006/0181519 | A1* | 8/2006 | Vernier et al. | 345/173 |
| 2006/0242607 | A1* | 10/2006 | Hudson | 715/863 |
| 2006/0244735 | A1* | 11/2006 | Wilson | 345/173 |
| 2006/0274046 | A1* | 12/2006 | Hillis et al. | 345/173 |
| 2007/0061126 | A1* | 3/2007 | Russo et al. | 703/24 |
| 2007/0146336 | A1* | 6/2007 | Ording et al. | 345/173 |
| 2007/0150826 | A1* | 6/2007 | Anzures et al. | 715/772 |
| 2007/0198942 | A1* | 8/2007 | Morris | 715/767 |
| 2008/0055273 | A1* | 3/2008 | Forstall | 345/173 |
| 2009/0073194 | A1* | 3/2009 | Ording | 345/672 |

FOREIGN PATENT DOCUMENTS

| | | |
|---|---|---|
| EP | 0622722 A2 | 4/1994 |
| EP | 0965948 A2 | 6/1999 |
| EP | 1241558 A2 | 3/2002 |
| WO | WO 02/19081 A2 | 3/2002 |
| WO | WO 2006/020304 A2 | 2/2006 |
| WO | WO 2006/020305 A2 | 2/2006 |

OTHER PUBLICATIONS

Coolsmartphone, "Orange SPV C600 Review," CoolSmartPhone. com, Apr. 14, 2006, 58 pages, http://www.coolsmartphone.com/article569.html.

Fling, B., "Designing for Mobile, Bringing Design Down to Size," copyright © 2006 Blue Flavor.

Jazzmutant, "Human Machine Interfaces for Real-time Applications," Aug. 14, 2007, 20 pages, http://www.jazzmutant.com/index.php.

Roto et al., "Minimap—A Web Page Visualization Method for Mobile Phones," CHI 2006, Montréal, Québec, Canada, Apr. 22-27, 2006, 10 pages.

Salmre, I., "Chapter 2, Characteristics of Mobile Applications," Salme_02.fm, Dec. 20, 2004, 18 pages.

Xiao et al., "Slicing*-Tree Based Web Page Transformation for Small Displays," CIKM'05, Bremen, Germany, Oct. 31-Nov. 5, 2005, 2 pages.

International Search Report for International Application No. PCT/US2006/062759, mailed Aug. 1, 2007.

Alejandre, S., "Graphing Linear Equations," http://mathforum.org/alejandre/palm/times.palm.html, printed Jun. 12, 2006, 3 pages.

Han, J.Y., "Multi-Touch Interaction Research," http://mrl.nyu.edu/~jhan/ftirtouch/, printed Apr. 13, 2006, 4 pages.

Karlson et al., "AppLens and Lunch Tile: Two Designs for One-handed Thumb Use on Small Devices," http://heil.cs.umd.edu/trs/2004-37.html, printed Jun. 12, 2006, 11 pages.

Bitstream®, "ThunderHawk Pocket PC Edition for End Users," http://www.bitstream.com/wireless/products/pocketpc/faq_using.html, printed Jun. 12, 2006, 4 pages.

Designing Interfaces.com, "Animated Transition," http://designinginterfaces.com/Animated_Transition, printed Oct. 16, 2006, 2 pages.

Jazzmutant, "Jazzmutant Lemur," http://64.233.167.104/search?q=cache:3g4wFSaZiXIJ:www.nuloop.c, printed Nov. 16, 2005, 3 pages.

Jazzmutant, "The Lemur: Multitouch Control Surface,"http://64233.167.104/search?q=cache:j0_nFbNVzOcJ:www.cycling7, printed Nov. 16, 2005, 3 pages.

Office Action dated Mar. 22, 2010, received in Australian Innovation Patent No. 2006101096, which corresponds to U.S. Appl. No. 11/618,633.

Office Action dated Mar. 10, 2010, received in Chinese Application for Invention No. 200680053036.X, which corresponds to U.S. Appl. No. 11/618,633.

Opera Software, "Download the Opera Mobile™ Browser," 5 pages, http://www.opera.com/products/mobile/products/, Oct. 19, 2006.

Opera Software, "Opera for Mobile, The Full Web Anytime, Anywhere," Jan. 2006, 7 pages, www.opera.com/mobile.

Opera Software, "Opera for S60 Tutorial," Apr. 5, 2006, 5 pages, http://www.opera.com/support/tutorials/260/.

Opera—Press Releases Database, "The New Opera Browser for Series 60 Features Zoom and Password Manager," Nov. 14, 2005, 3 pages, http://press-releases.techwhack.com/1334/1411-opera-browser-features-zoom-and-password.

Opera Software, "Opera for Windows Mobile Smartphone 2003 Tutorial," Apr. 5, 2005, 4 pages, http://www.opera.com/support/tutorials/winmobile.

Opera Software, "Opera 8.5 Beta 2 for Windows Mobile, Pocket PC," Apr. 5, 2006, 2 pages, http://www.opera.com/products/mobile/products/winmobileppc.

Opera, "Opera 8.5 for S60 Phones—Get the Full Internet Experience on Your Mobile Phone," Apr. 5, 2006, 3 pages, http://www.symbian-freak.com/news/1105/opera.htm.

Wobbrock, J. et al., "WebThumb: Interaction Techniques for Small-Screen Browsers," UIST'02, Oct. 27-30, 2002, Paris France, 4 pages.

\* cited by examiner

PORTABLE ELECTRONIC DEVICE WITH MULTI-TOUCH INPUT

RELATED APPLICATIONS

This application claims priority to U.S. Provisional Patent Application No. 60/755,366, filed Dec. 30, 2005, entitled "Portable Electronic Device with Multi-Touch Input," which application is incorporated by reference herein in its entirety.

TECHNICAL FIELD

The disclosed embodiments relate to user interfaces that employ multi-touch-sensitive displays.

BACKGROUND

As portable devices become more compact, and the amount of information to be processed and stored increases, it has become a significant challenge to design a user interface that allows users to easily interact with the device. This is unfortunate because the user interface is the gateway through which users receive not only content but also responses to user actions or behaviors, including user attempts to access a device's features or tools. Some portable electronic devices (e.g., mobile phones) have resorted to adding more pushbuttons, overloading the functions of pushbuttons, or using complex menu systems to allow a user to access, store and manipulate data. These conventional interfaces often result in complex key sequences and menu hierarchies that must be memorized by the user. Indeed, some key sequences are so complex as to require two hands to complete.

Accordingly, there is a need for simpler, more intuitive user interfaces for portable devices that will enable a user to access, store and manipulate graphical objects and data without memorizing key sequences or menu hierarchies.

SUMMARY OF EMBODIMENTS

The above deficiencies and other problems associated with user interfaces for portable devices are reduced or eliminated by the disclosed portable electronic device that uses multi-touch input to detect one or more contacts and/or motions. The device performs one or more operations on a graphical object based on the one or more user contacts and/or motions.

In some embodiments, a method of detecting multi-touch input in a portable electronic device includes: displaying an object on a display surface of a portable electronic device; detecting multi-touch input associated with the object; determining, based on the multi-touch input, an operation to be performed on the object; and performing the operation on the object. The object may have a resolution that is less than a pre-determined threshold when the operation is performed on the object, and the object may have a resolution that is greater than the pre-determined threshold at other times.

In some embodiments, a portable electronic device includes a multi-touch-sensitive display and one or more processors coupled to the multi-touch-sensitive display to detect motion of two or more fingers of a user in contact with the multi-touch-sensitive display. The detected motion is used to determine an operation to be performed on an object presented or displayed on the multi-touch-sensitive display. The device then performs the operation on the object. The object may have a resolution that is less than a pre-determined threshold when the operation is performed on the object, and the object may have a resolution that is greater than the pre-determined threshold at other times.

In some embodiments, a portable electronic device includes a multi-touch-sensitive display. A detector is coupled to the multi-touch-sensitive display and adapted to detect motion of two or more fingers of a user in contact with the multi-touch-sensitive display. One or more processors coupled to the detector are configurable for determining an operation to be performed on an object presented on the multi-touch-sensitive display based on the detected motion and for performing the operation on the object. The object may have a resolution that is less than a pre-determined threshold when the operation is performed on the object, and the object may have a resolution that is greater than the pre-determined threshold at other times.

In some embodiments, a method of adjusting a parameter using a multi-touch-sensitive display includes: detecting one or more contacts on a display surface of a multi-touch-sensitive display device; displaying at least one graphical object at a contact location; detecting motion associated with the one or more contacts; adjusting at least one parameter of the object based on the motion; and detecting at least one lost contact. In response to detection of a lost contact a current value of the parameter is saved and a timer is started. In response to the timer exceeding a threshold before contact is reestablished, the graphical object is removed from the display surface. In response to contact being reestablished before the timer exceeds the threshold, the display of the graphical object is maintained on the display surface. Motion of the one or more contacts is again detected and the parameter is adjusted based on the detected motion.

In some embodiments, a method of displaying a Web page on a portable electronic device includes: receiving a Web page; automatically scaling the Web page to display the entire Web page in a display window; receiving a first touch input; activating the Web page and at least some fields or links in the Web page in response to the first touch input; receiving a second touch input; and performing an operation on the Web page in response to the second touch input. The Web page may have a resolution that is less than a pre-determined threshold when the operation is performed on the Web page, and the Web page may have a resolution that is greater than the pre-determined threshold at other times.

In some embodiments, a method of adjusting a parameter using a multi-touch-sensitive display includes: detecting one or more first contacts on a display surface of a multi-touch-sensitive display device; detecting a first motion that corresponds to a gesture and is associated with the one or more first contacts; adjusting at least one parameter in accordance with the first motion; detecting a breaking of the one or more first contacts; detecting one or more second contacts on a display surface; detecting a second motion associated with the one or more second contacts, wherein the second motion corresponds to the gesture; and adjusting the at least one parameter in accordance with the second motion.

In some embodiments, a method includes: displaying a graphical object (e.g., a Web page) in a touch screen display of a portable electronic device, wherein down sampled data is used to display the object; detecting multi-touch input associated with the object; determining, based on the multi-touch input, an operation to be performed on the object; performing the operation on the object; displaying changes to the object caused by the operation in real time using the down sampled data; and displaying the object with resampled data after the operation.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Attention is first directed towards embodiments of portable devices, including portable communications devices, that have user interfaces that use multi-touch input to detect one or more contacts and/or motions. Such devices perform one or more operations on a graphical object based on the one or more user contacts and/or motions.

Overview of Multi-Touch Input Operations

Figure 1:
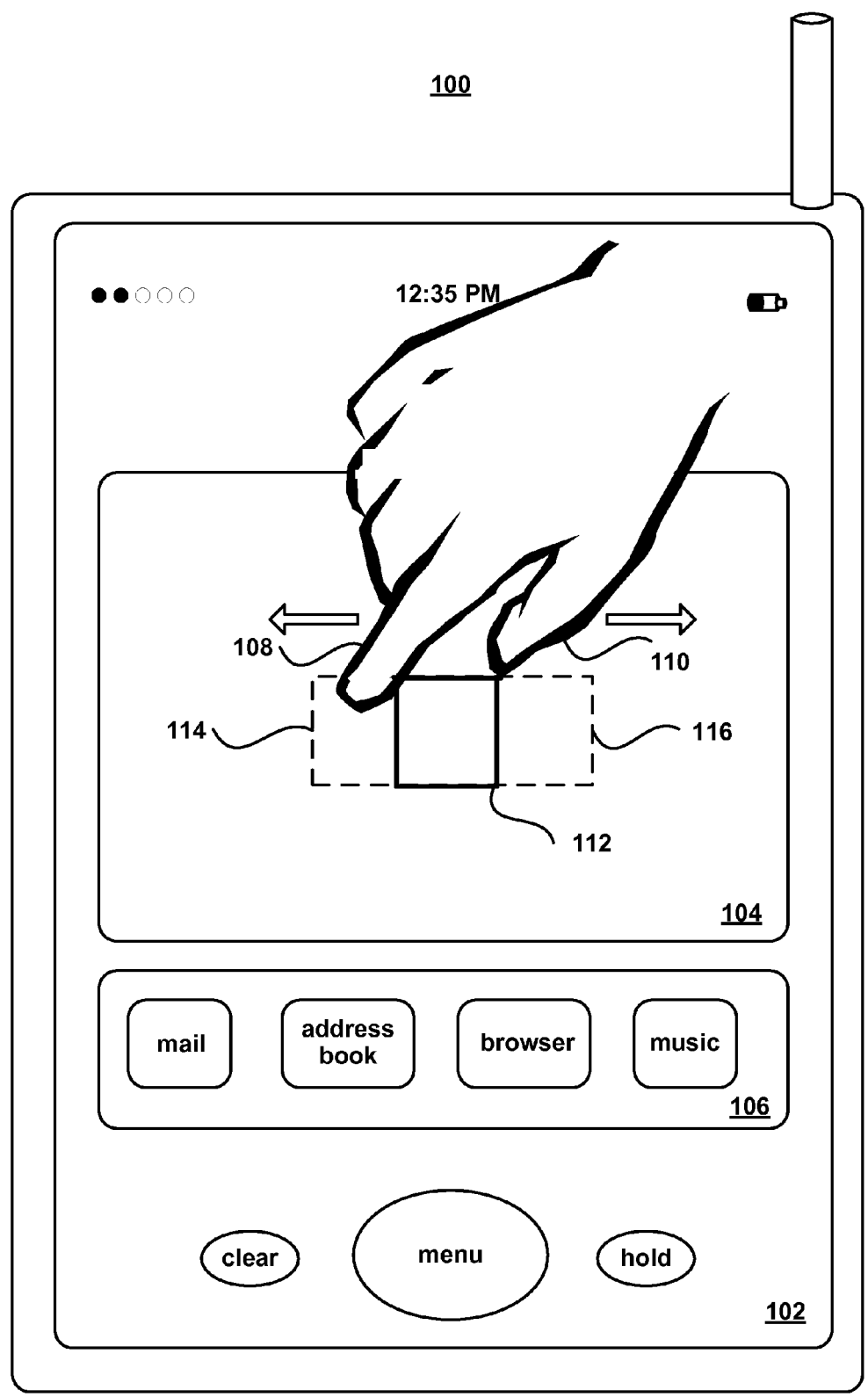
FIG. 1 is an illustration of one embodiment of a portable electronic device responsive to multi-touch input.

FIG. 1 is an illustration of one embodiment of a portable electronic device 100 responsive to multi-touch input. The device 100 includes a multi-touch-sensitive display with a graphical user interface (GUI) 102. The display surface is transparent to allow various graphical objects to be displayed to the user (e.g., Web pages). In some embodiments, the GUI 102 can be divided into multiple sections or windows. For example, the GUI 102 can include a tray 106 for holding graphical objects representing frequently used functions (e.g., email, address books, browser, music, etc.). The GUI 102 can also include a window 104 for manipulating graphical objects, displaying and operating on Web pages, reading messages, text or data, and entering information. Various displays can be presented and changed in the GUI 102 by pressing a menu button. In mobile phone embodiments, dedicated graphical objects can be presented in the GUI 102 representing traditional voice and data service operations (e.g., hold, clear, etc.).

A user can manipulate one or more graphical objects 112 in the GUI 102 using various single or multi-finger gestures. As used herein, a gesture is a motion of the object/appendage making contact with the touch screen display surface. One or more fingers can be used to perform two-dimensional or three-dimensional operations on one or more graphical objects 112 presented in GUI 102, including but not limited to magnifying, zooming, expanding, minimizing, resizing, rotating, sliding, opening, closing, focusing, flipping, reordering, activating, deactivating and any other operation that can be performed on a graphical object. In some embodiments, the gestures initiate operations that are related to the gesture in an intuitive manner. For example, a user can place an index finger 108 and thumb 110 (not drawn to scale in the figure) on the sides, edges or corners of the graphical object 112 and perform a pinching or anti-pinching gesture by moving the index finger 108 and thumb 110 together or apart, respectively. The operation initiated by such a gesture results in the dimensions of the graphical object 112 changing. In some embodiments, a pinching gesture will cause the size of the graphical object 112 to decrease in the dimension being pinched. In some embodiments, a pinching gesture will cause the size of the graphical object 112 to decrease proportionally in all dimensions. In some embodiments, an anti-pinching or de-pinching movement will cause the size of the graphical object 112 to increase in the dimension being anti-pinched. In FIG. 1, the user's index finger 108 and thumb 110 are used to anti-pinch or expand the sides of a square graphical object 112, resulting in an increase in the x-dimension of the object 112, as indicated by the dashed lines 114 and 116. In other embodiments, an anti-pinching or de-pinching movement will cause the size of a graphical object to increase in all dimensions (e.g., enlarging proportionally in the x and y dimensions).

In some embodiments, the graphical object 112 is displayed with a resolution that is greater than a pre-determined resolution (e.g., one half or one quarter of the touch screen resolution). When the presentation of the graphical object 112 is being modified in accordance with the operation, the graphical object 112 may be displayed with a resolution that is less than the pre-determined threshold. On a portable device with limited processing speed, displaying at a lower resolution during the operation permits changes to the object to be seen with little or no perceptible lag time, thereby making the user interface more responsive to user input.

It should be apparent, that any number and/or combination of fingers can be used to manipulate a graphical object, and the disclosed embodiment is not limited to any particular number or combination. For example, in some embodiments the user can magnify an object by placing multiple fingers in contact with the display surface 102 and spreading the fingers outward in all directions. In other embodiments, a user can expand or minimize an object by grabbing the corners, sides or edges of the object and performing a de-pinching or pinching action. In some embodiments, the user can focus on or magnify a particular object or a portion of an object by tapping one or more fingers on the display surface 102.

In some embodiments, a contact occurs when the user makes direct contact with the graphical object to be manipulated. In other embodiments, a contact occurs when the user makes contact in the proximity of the graphical object to be manipulated. The latter technique is similar to "hot spots" used with Web pages and other computer user interfaces.

Contact/Motion Detection Process Flow

Figure 2:
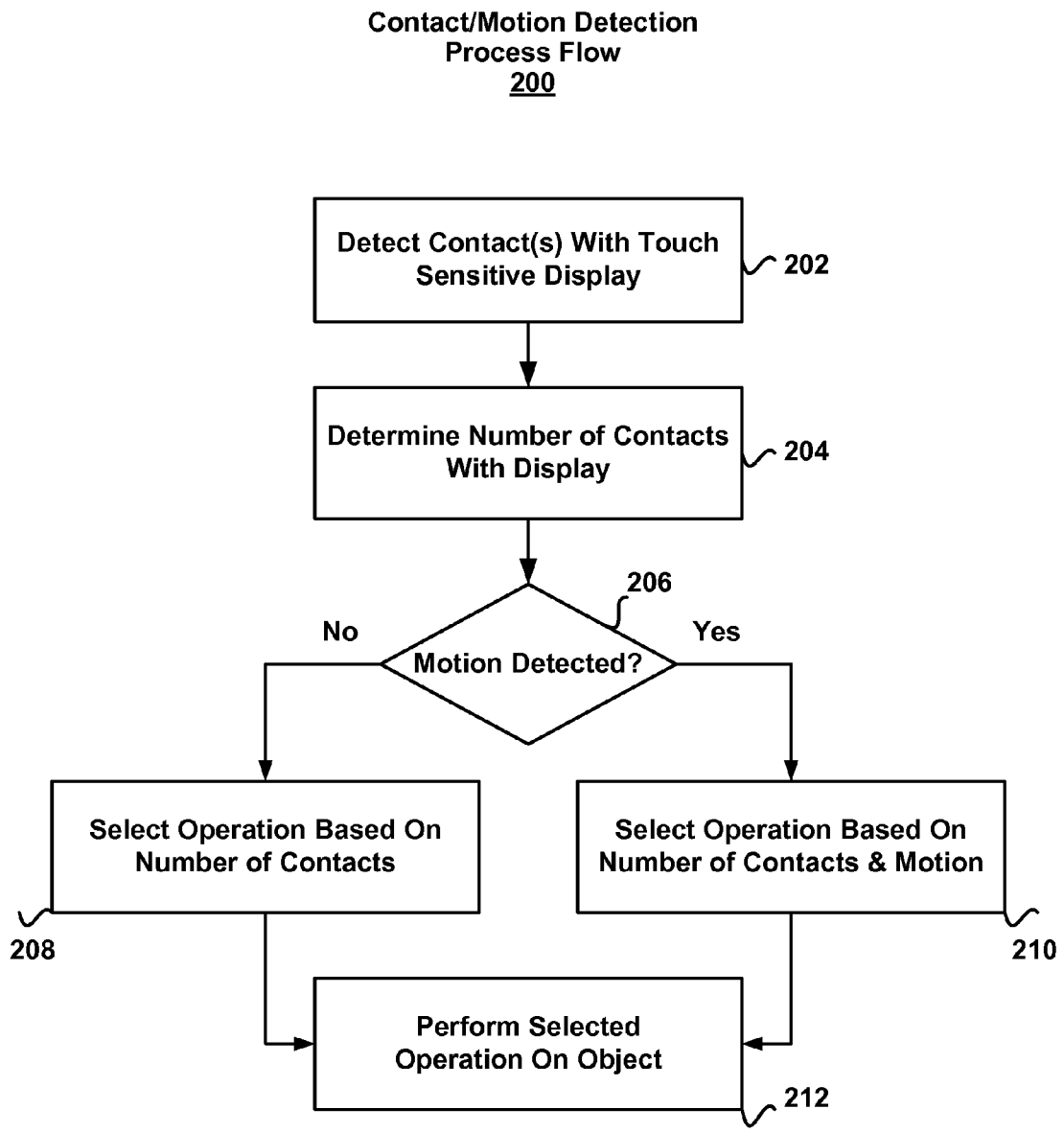
FIG. 2 is a flow diagram of one embodiment of a contact/motion detection process flow for the portable electronic device shown in FIG. 1.

FIG. 2 is a flow diagram of one embodiment of a contact/motion detection process flow 200 for the portable electronic device 100 shown in FIG. 1. While the contact/motion detection process flow 200 described below includes a number of operations that appear to occur in a specific order, it should be apparent that these processes can include more or fewer operations, which can be executed serially or in parallel (e.g., using parallel processors or a multi-threading environment).

The process flow 200 begins by detecting a contact with the display surface 102 (202). Once a contact is detected the number of contacts (i.e., the number of fingers in contact with the display surface) is determined (204). If motion is detected (206) then one or more operations are selected based on the number of contacts and the type of motion (210), such as a rotating, twisting, sliding, or pinching gesture. The selected operation is then performed on the associated graphical object (212). The operation can be selected based on any combination or sequence of motions and contacts, including but not limited to rotating or twisting fingers, sliding fingers, quick repetitive contacts with the display surface, pinching, anti-pinching gestures, etc. on or near the graphical object. If motion is not detected (206) then an operation is selected based on the number of contacts only (208) and performed on the associated graphical object (step 212).

Parameter Adjustment

Figure 3:
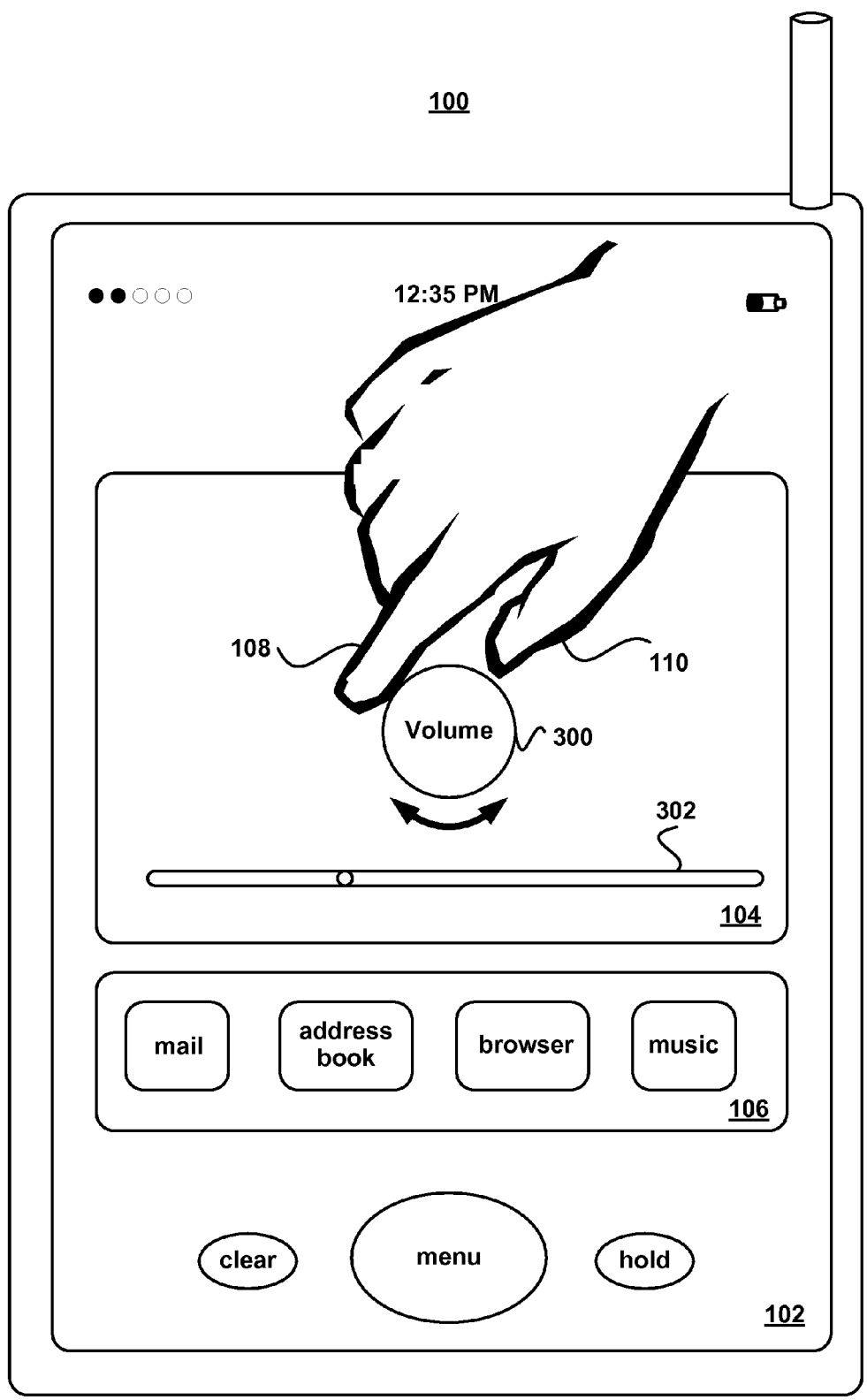
FIG. 3 is an illustration of one embodiment of a portable electronic device responsive to multi-touch input for parameter adjustment.

FIG. 3 is an illustration of one embodiment of a portable communication device 100 responsive to multi-touch input for parameter adjustment. This embodiment is useful for controlling one or more parameters in an application, such as a volume control for a media player or mobile phone. In some embodiments, a graphical object 300 appears in response to one or more contacts with the display surface 102. The graphical object 300 could be a knob, a switch, one or more pushbuttons or any other recognizable control typically used with electronic or computer devices. In some embodiments, a user can place one or more fingers (e.g., index finger 108 and thumb 110) at one or more locations on or near the graphical object 300 and make a gesture to adjust the parameter being controlled. For example, if the graphical object 300 is a knob then the user can place one or more fingers along the circumference of the knob and make a rotating or twisting motion in a clockwise or counterclockwise direction to adjust the parameter.

In media player applications, when a user makes a particular type of contact (e.g., three or four finger contact) a graphical object 300 appears on the display surface 102 at or near the point of contact. The user can then adjust a parameter (e.g., volume, radio tuner, equalization) of a song or other audio source by making a twisting motion. In some embodiments, the graphical object 300 is animated so that the object appears to turn in sync with the twisting motion made by the user. In other embodiments, one or more additional graphics 302 (e.g., a bar graph, etc.) or text can be added to the display surface 102 so that the user can determine the value of the parameter being adjusted.

In some embodiments, the user can adjust a parameter by increasing or decreasing the amount of pressure applied at the contact location. For example, in media player applications, when a user makes contact with the display surface 102 a graphical object 300 of a radio interface can be displayed. The radio interface may include a seek button for changing radio stations. The user can then change radio stations by pressing the seek button. The seek speed can be adjusted based on the amount of pressure applied by the user on the seek button or a time duration of contact with the seek button.

Parameter Adjustment Process Flow

Figure 4A:
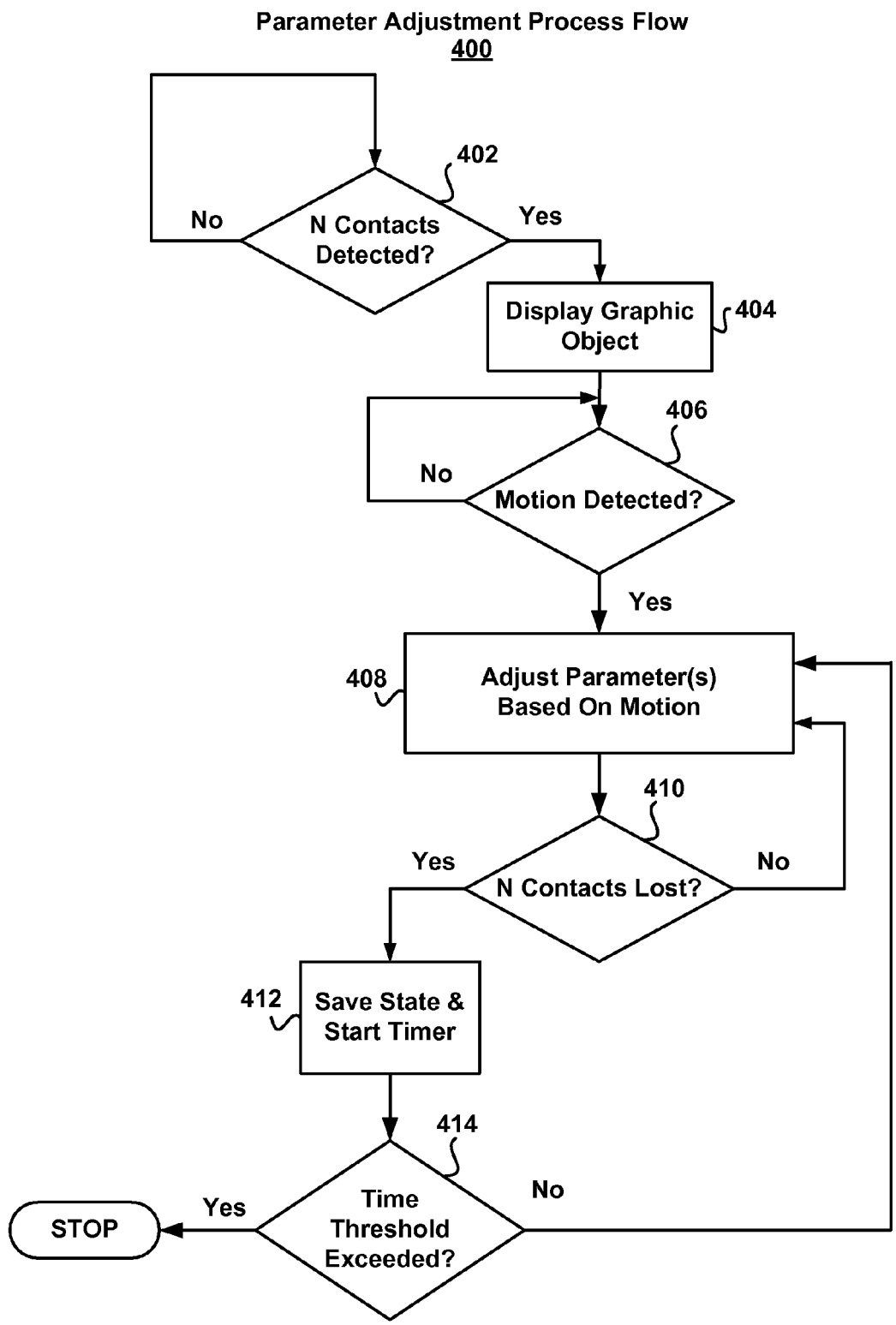
FIG. 4A is a flow diagram of one embodiment of a parameter adjustment process flow.

FIG. 4A is a flow diagram of one embodiment of a parameter adjustment process flow 400. While the parameter adjustment process flow 400 described below includes a number of operations that appear to occur in a specific order, it should be apparent that these processes can include more or fewer steps or operations, which can be executed serially or in parallel (e.g., using parallel processors or a multi-threading environment).

When adjusting a parameter (such as the volume control knob described with respect to FIG. 3) there may be a scenario where the user loses contact with the display surface 102. For example, in a combination media player/mobile phone device, the user may receive a call while adjusting the volume of a song. After the user is finished with the call, he or she would like to continue with adjusting the volume. Rather than removing the graphical object 300 (FIG. 3) from the display surface 102 (FIG. 3), the graphical object 300 (FIG. 3) can be left on the display surface 102 (FIG. 3) in its current state for a predetermined period of time. The amount of time can be set by the user as an option in a preference pane or window accessible from a menu system.

In some embodiments, the above functionality can be realized with the parameter adjustment process flow 400. The process flow 400 begins by detecting N contacts on the display surface (402). When N contacts are detected one or more graphical objects are presented on the display surface at or near the point of contact (404). The user is then allowed to adjust the parameter by making a gesture at or near the point of contact. If motion is detected (406) then the parameter is adjusted based on the motion (408). The graphical object can be animated to simulate the motion and to indicate to the user that the parameter is being adjusted. If one or more of the N contacts is lost (410) then the current value or state of the parameter is saved and a timer is started (412). If the timer exceeds a threshold time before contact is reestablished (414) then the graphical object is removed from the display surface and the current value of the parameter is saved. If contact is reestablished before the timer exceeds the threshold time then the graphical object remains on the display surface, allowing the user to continue adjusting the parameter from its last value computed during operation 408.

Figure 4B:
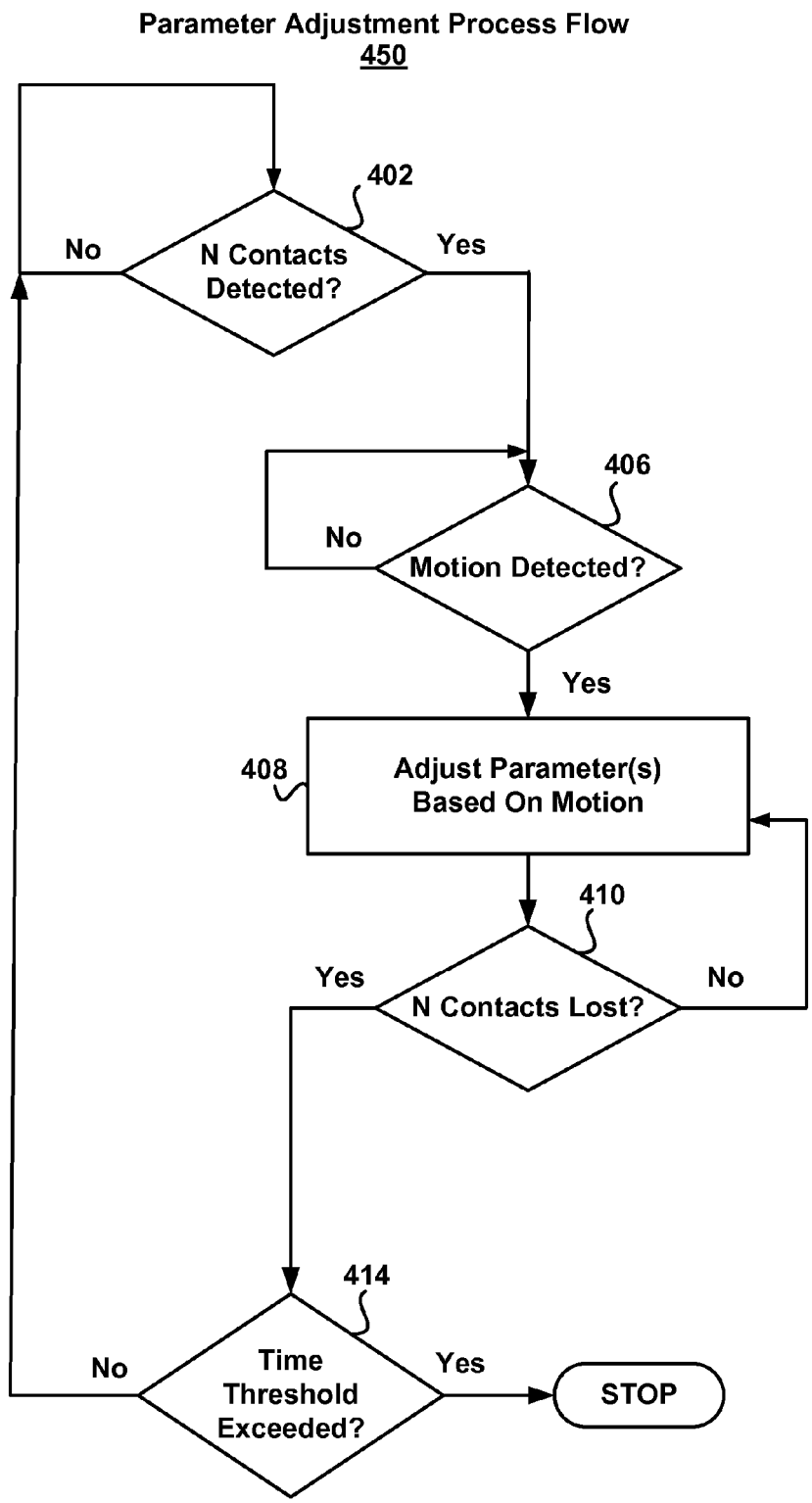
FIG. 4B is a flow diagram of one embodiment of a parameter adjustment process flow.

FIG. 4B is a flow diagram of one embodiment of a parameter adjustment process flow 450. While the parameter adjustment process flow 450 described below includes a number of operations that appear to occur in a specific order, it should be apparent that these processes can include more or fewer steps or operations, which can be executed serially or in parallel (e.g., using parallel processors or a multi-threading environment).

When adjusting a parameter (such as a magnification or an orientation of a displayed graphical object) there may be a scenario where the user intentionally loses contact with the display surface 102. For example, the user may wish to adjust the parameter by making a multi-touch gesture two or more times. The gesture may include repetitive motions, such as rotation (corresponding, for example, to turning a knob) or de-pinching (where the user makes contact with his or her fingers close together and then moves them apart). For example, the user may make contact, perform the gesture, break contact, make contact again, and perform the gesture again. Such a sequence may be repeated multiple times. The adjustment of the displayed graphical object may be in accordance with the gesture. In some embodiments, operations corresponding to such repeated gestures may be applied or used to modify the displayed graphical object if an elapsed time between breaking contact and making contact again is less than a pre-determined value or time interval.

In some embodiments, the above functionality can be realized with the parameter adjustment process flow 450. The process flow 450 begins by detecting N contacts on the display surface (402). The user adjusts a parameter associated with a graphical object by making a gesture at or near the graphical object. If motion is detected (406) then the parameter is adjusted based on the motion (408). The graphical object can be animated to simulate the motion and to indicate to the user that the parameter is being adjusted. If one or more of the N contacts is lost (410) and a timer exceeds a threshold time before contact is reestablished (414), the parameter for the graphical object may remain unchanged, even if additional N contacts are detected. If one or more of the N contacts is lost (410) and the timer is less than a threshold time before contact is reestablished (414), the parameter may be adjusted based on subsequent detected motion (408). In other embodiments, the timer operation (414) may be removed from the parameter adjustment process flow 450.

In some embodiments, the use of the timer may allow modification of the parameter for the graphical object without requiring undue precision in the N contacts. For example, if multiple gestures are used to change the parameter it may be difficult for the user to align the N contacts during the multiple instances. By using the timer, it may be understood that N contacts that are proximate to N previous contacts within the threshold time correspond to a same respective graphical object. A subsequent gesture, therefore, may be used to modify the parameter for the respective graphical object.

Figure 5:
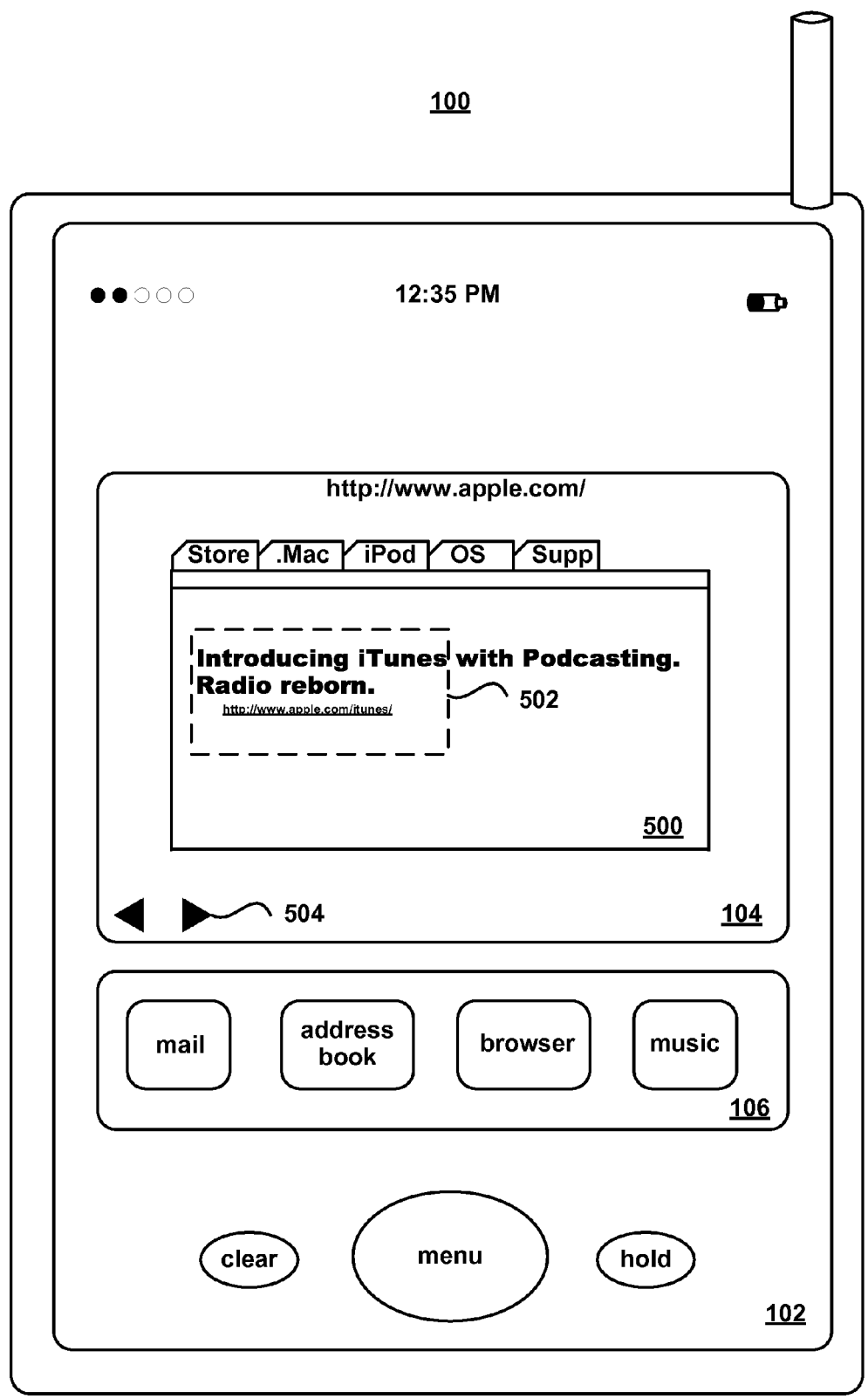
FIG. 5 is an illustration of one embodiment of a portable electronic device with a Web browser.

In some embodiments, variation of the parameter may be a non-linear function of a displacement of the N contacts during the gesture. For example, the magnification and/or orientation change may be an exponential function of the rotation and/or de-pinching gesture. This may allow the user to modify the graphical object without making multiple gestures or by using fewer gestures than would otherwise be needed with a linear variation of the parameter as a function of the displacement of the N contacts during the gesture Web Browsing Embodiment FIG. 5 is an illustration of one embodiment of a portable electronic device 100 with a Web browser. In some embodiments, a scaled down version of an entire Web page 500 is displayed on the display surface 102. This enables the user to see the entire content of the Web page. A user can zoom in on a portion of the Web page 502 using one or more finger gestures or taps. In some embodiments, a user can zoom in on a portion of the Web page 500 by tapping on a portion of the Web page 500 or by making a de-pinching gesture near or on the portion to be zoomed. In some embodiments, a user can zoom out from a portion of the Web page 500 by selecting a zoom out button or other mechanism 504 presented on the display surface 102, or by performing a different gesture or sequence of taps (e.g., pinching to zoom out). In some embodiments, a predefined Web page gesture can be used to activate the Web page 500, such as a single or double tap. When the Web page 500 becomes active, any links, text entry fields, pull-down menus, checkboxes, or the like included in the Web page 500 will become active. In some embodiments, if a Web page 500 is designated "read-only" then it can be displayed and zoomed but not interacted with by a user (e.g., links in the page cannot be clicked on or otherwise activated).

In some embodiments, the Web page 500 is displayed with a resolution that is greater than a pre-determined resolution (e.g., one half or one quarter of the touch screen resolution). When the presentation of the Web page 500 is being modified in accordance with an operation, such as zooming in, the Web page 500 may be displayed with a resolution that is less than the pre-determined threshold.

In some embodiments, the Web page 500 is displayed while zooming in or magnifying using previously down sampled data for the Web page 500 (i.e., using data for the Web page (or, more generally, object) that was down sampled prior to zooming in or magnifying the object). Thus, the displayed image may become pixelated during the zoom in. The Web page 500 may be re-rendered at a higher resolution corresponding to a final magnification after the zoom in. In some embodiments, the resolution of the Web page 500 may be down sampled when zooming out or de-magnifying. The zooming operation may be a non-linear function of the gesture(s) and/or the tap(s). For example, the change in magnification may be a nonlinear function of a displacement(s) or a range of motion(s) corresponding to the gesture(s) and/or the tap(s).

Figure 6A:
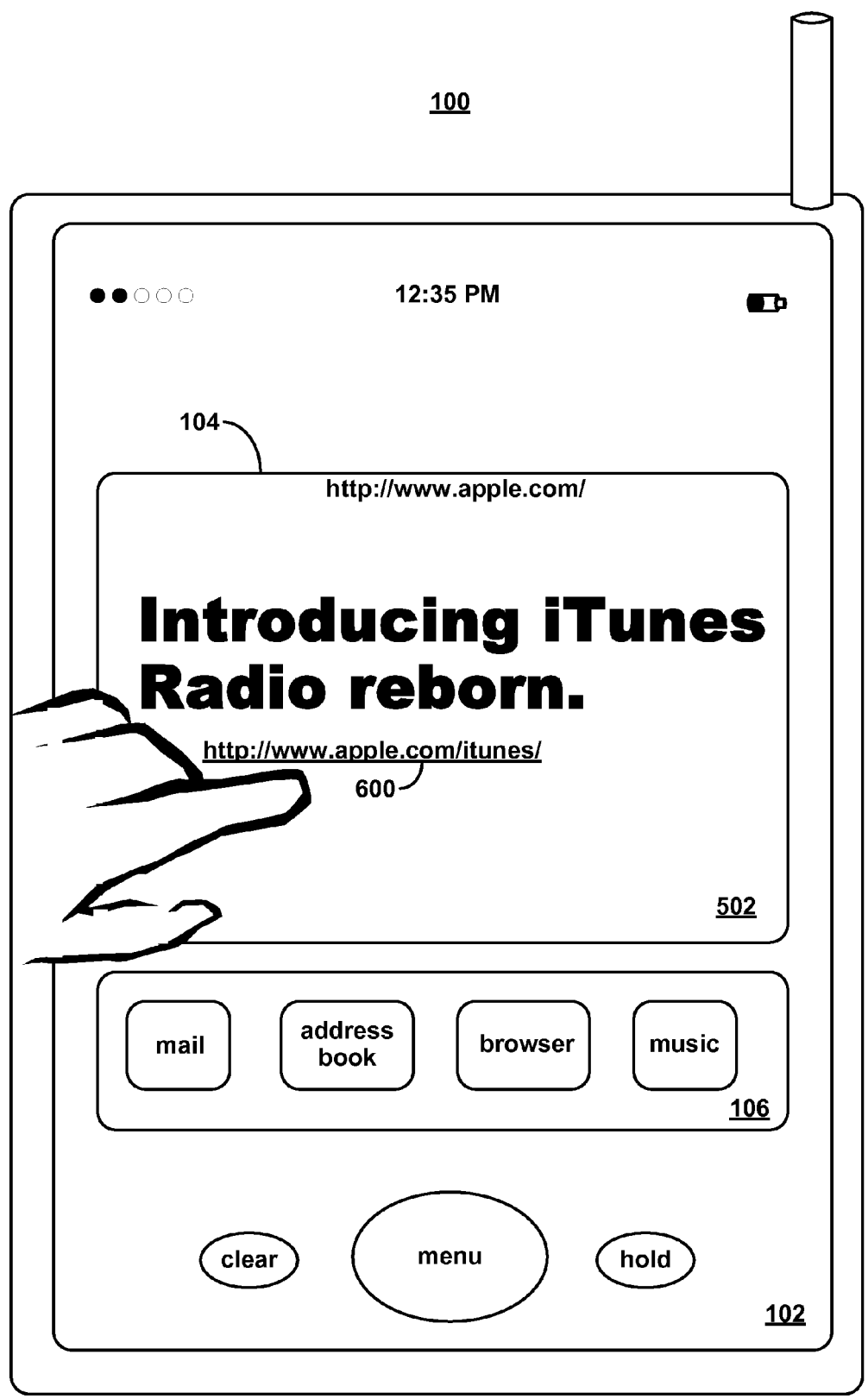
FIG. 6A illustrates one embodiment of a zooming operation using the Web browser shown in FIG. 5.

FIG. 6A illustrates one embodiment of a zooming operation using the Web browser shown in FIG. 5. While in zoom mode, a user can navigate across the Web page 500 in multiple directions using multi-touch input. In FIG. 6A, the user has zoomed in on a portion 502 of the Web page 500 and can change the portion of the Web page displayed in window 104 by sliding a finger (not drawn to scale in FIG. 6A) along the display surface 102 in the desired direction. For example, if the user slides a finger in window 104 towards the top of the device 100 then the Web page 500 will move in that direction, revealing lower portions of the Web page 500 previously out of view (not previously displayed in window 104). In some embodiments, the speed at which the Web page 500 moves through the window 104 can be determined by the speed or frequency of the gesture. For example, a walking finger gesture can cause the Web page 500 to move in accordance with the speed at which the user walks her fingers along the display surface 102. In some embodiments, a user can activate a link 600 or "hot spot" by tapping on it one or more times with one or more fingers. In other embodiments, the user can activate a virtual keyboard or other input device by tapping on the display surface 102, as described with respect to FIG. 6B.

Figure 6B:
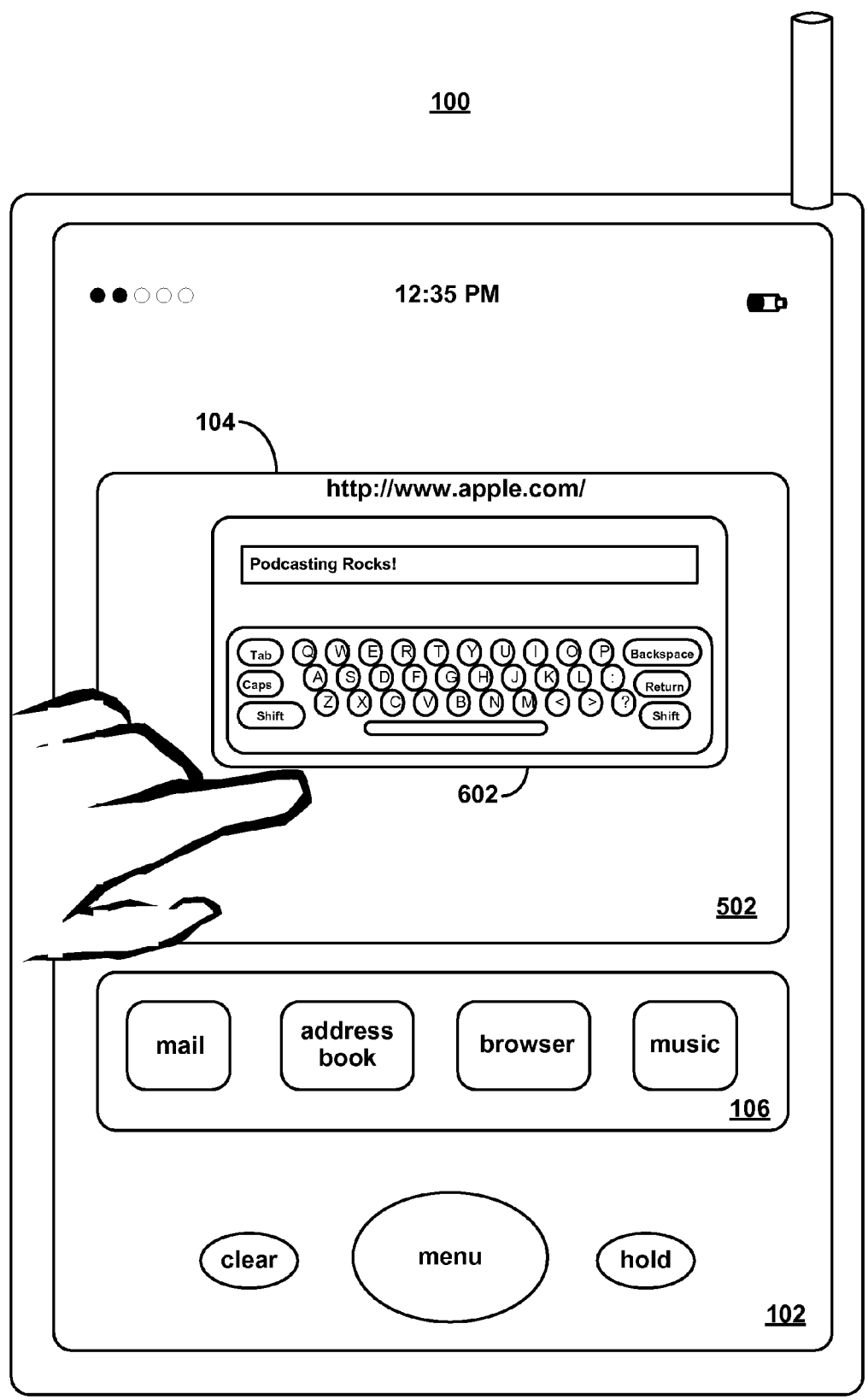
FIG. 6B illustrates one embodiment of a virtual keyboard activated in the Web browser.

FIG. 6B illustrates one embodiment of a virtual keyboard 602 activated in the Web browser. In response to user touch input (e.g., a tap) a virtual keyboard is displayed in window 104 of display surface 102. In some embodiments, the keyboard 602 is a graphical object that can be resized, minimized, restored up or down or moved around the display surface 102 with one or more fingers. The keyboard 602 can be used to input data into dialogue boxes or other text input fields typically found on Web pages. As the user types the soft keys, the typed input is displayed to the user for verification and editing purposes. In some embodiments, each soft key will change in appearance to indicate when it has become active. For example, the key may expand, change color, vibrate or become highlighted when the user's finger is proximate to the key location. In some embodiments, once a key is activated the other keys become locked to prevent inadvertent input. This feature provides the user with a visual clue when a key has been selected, thus reducing input error due to inadvertently pressing a neighboring key. The user can remove the virtual keyboard 602 from the display surface by tapping on the display surface (e.g., tapping twice) or by pressing a virtual close mechanism (e.g., virtual close button).

Web Browser Process Flow

Figure 7:
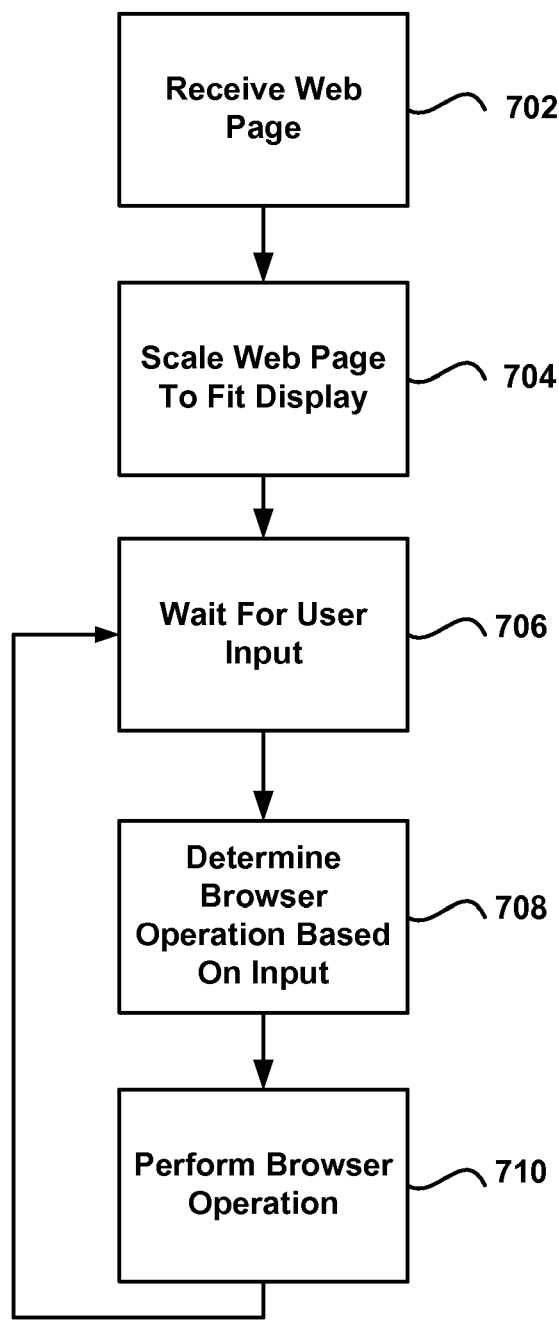
FIG. 7 is a flow diagram of one embodiment of a Web browser process flow.

FIG. 7 is a flow diagram of one embodiment of a Web browser process flow 700 for the Web browser described with respect to FIGS. 6A and 6B. While the contact/motion detection process flow 700 described below includes a number of operations that appear to occur in a specific order, it should be apparent that these processes can include more or fewer operations, which can be executed serially or in parallel (e.g., using parallel processors or a multi-threading environment). In response to multi-touch input the device receives a Web page from a server (702). The Web page is then scaled to fit within the display (e.g., within window 104) (704). The device 100 waits for user input, such as a de-pinching gesture to indicate the user's intent to zoom in on a portion of the Web page (706). A browser operation is determined based on the received input (708) and the device 100 performs the browser operation (710).

Portable Electronic Device Architecture

Figure 8:
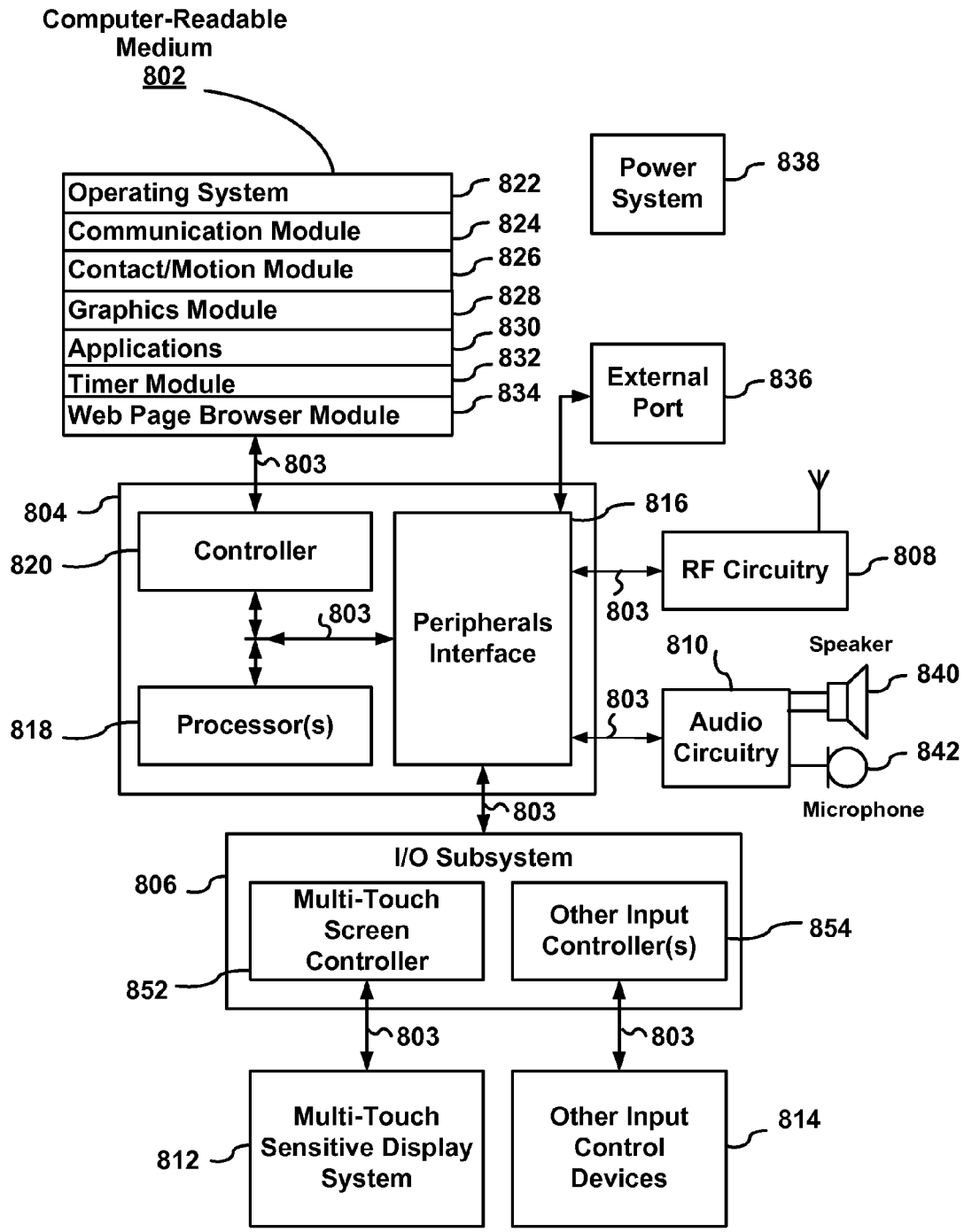
FIG. 8 is a block diagram of one embodiment of portable electronic device architecture.

FIG. 8 is a block diagram of one embodiment of a portable electronic device architecture. A portable electronic device 800 generally includes one or more computer-readable mediums 802, a processing system 804, an Input/Output (I/O) subsystem 806, radio frequency (RF) circuitry 808 and audio circuitry 810. These components may be coupled by one or more communication buses or signal lines 803. The device 800 can be any portable electronic device, including but not limited to a handheld computer, a tablet computer, a mobile phone, a media player, personal digital assistant (PDA) and the like, including a combination of two or more of these items.

It should be apparent that the architecture shown in FIG. 8 is only one example of an architecture for the portable electronic device 800, and that the device 800 could have more or fewer components than shown, or a different configuration of components. The various components shown in FIG. 8 can be implemented in hardware, software or a combination of both hardware and software, including one or more signal processing and/or application specific integrated circuits. The RF circuitry 808 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 808 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, voice over Internet Protocol (VoIP), a protocol for email, instant messaging, and/or a short message service (SMS), or any other suitable communication protocol, including communication protocols not yet developed as of the filing date of this document.

The RF circuitry 808 and the audio circuitry 810 are coupled to the processing system 804 via the peripherals interface 816. The interface 816 includes various known components for establishing and maintaining communication between peripherals and the processing system 804. The audio circuitry 810 is coupled to an audio speaker 840 and a microphone 842 and includes known circuitry for processing voice signals received from interface 816 to enable a user to communicate in real-time with other users. In some embodiments, the audio circuitry 810 includes a headphone jack (not shown). Voice and data information received by the RF circuitry 808 and the audio circuitry 810 (e.g., in speech recognition or voice command applications) is sent to one or more processors 818 via the interface 816. The one or more processors 818 are configurable to process various data formats for one or more applications 830.

Note that the term "data" includes but is not limited to text, graphics, Web pages, JAVA applets, emails, instant messages, voice, digital images or video, widgets, MP3s, etc., which can be used by one or more applications 830 stored on medium 802 (e.g., Web browser, email, etc.). In some embodiments, the device 800 is capable of uploading and downloading various data from the Internet over a wireless network or an external port 836, such as files, songs, digital images, videos, emails, widgets, instant messages and the like.

The peripherals interface 816 couples the input and output peripherals of the device to the processor 818 and the computer-readable medium 802. The one or more processors 818 communicate with the one or more computer-readable mediums 802 via a controller 820. The computer-readable medium 802 can be any device or medium that can store code and/or data for use by the one or more processors 818. The medium 802 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 802 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 818 run various software components stored in the medium 802 to perform various functions for the device 800. In some embodiments, the software components include an operating system 822, a communication module (or set of instructions) 824, a contact/motion module (or set of instructions) 826, a graphics module (or set of instructions) 828, one or more applications (or set of instructions) 830, a timer module (or set of instructions) 832 and a Web browser module (or set of instructions) 834.

The operating system 822 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 824 facilitates communication with other devices over one or more external ports 836 and includes various software components for handling data received the RF circuitry 808 and/or the external port 836. The external port 836 (e.g., USB, FireWire™, etc.) is adapted for coupling directly to other devices or indirectly over a network (e.g., the Internet, wireless LAN, etc.).

The graphics module 828 includes various known software components for rendering, animating and displaying graphical objects on a display surface of the multi-touch-sensitive display system 812. Note that the term "graphical object" includes any object that can be displayed to a user, including without limitation text, web pages, icons, digital images, animations and the like.

The one or more applications 830 can include any applications installed on the device 800, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 800 may include the functionality of an MP3 player, such as an iPod (trademark of Apple Computer, Inc.). The device 800 may, therefore, include a 36-pin connector that is compatible with the iPod. In some embodiments, the device 800 may include one or more optional optical sensors (not shown), such as CMOS or CCD image sensors, for use with imaging applications.

The contact/motion module 826 includes various software components for performing various tasks associated with the multi-touch-sensitive display system 812, as previously described with respect to the embodiments in FIGS. 1-7.

The timer 832 is a software timer used with the parameter adjustment process flow 400, as described with respect to the embodiment 400 (FIG. 4A) and the embodiment 450 (FIG. 4B). The timer 832 can also be implemented in hardware.

The I/O subsystem 806 is coupled to the multi-touch-sensitive display system 812 and one or more other physical control devices 814 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. The multi-touch-sensitive display 812 communicates with the processing system 804 via the multi-touch sensitive screen controller 852 which includes various components for processing user input (e.g., scanning hardware). An example of multi-touch display system architecture is described below with respect to FIG. 9. The one or more other input controllers 854 receives/sends electrical signals from/to the other input or control devices 814. The other input/control devices 814 may include physical buttons (e.g., push buttons, rocker buttons, etc.), dials, slider switches, sticks, and so forth.

The multi touch-sensitive display 812 displays visual output to the user. The visual output may include text, graphics, video, and any combination thereof. Some or all of the visual output may correspond to user-interface objects. The multi touch-sensitive display 812 may also accept input from the user based on haptic and/or tactile contact. The multi touch-sensitive display 812 forms a touch-sensitive surface that accepts user input. The multi touch-sensitive display 812 and the multi-touch screen controller 852 (along with any associated modules and/or sets of instructions in the medium 802) detects contact (and any movement or release of the contact) on the multi touch-sensitive display 812 and converts the detected contact into interaction with user-interface objects, such as one or more soft keys, that are displayed on the touch screen when the contact occurs. In an exemplary embodiment, a point of contact between the multi touch-sensitive display 812 and the user corresponds to one or more digits of the user. The multi touch-sensitive display 812 may use LCD (liquid crystal display) technology, or LPD (light emitting polymer display) technology, although other display technologies may be used in other embodiments. The multi touch-sensitive display 812 and multi-touch screen controller 820 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the multi touch-sensitive display 812.

The touch-sensitive display may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, the touch-sensitive display displays visual output from the portable device, whereas touch sensitive tablets do not provide visual output. The multi touch-sensitive display 812 may have a resolution in excess of 100 dpi. In an exemplary embodiment, the touch screen 126 may have a resolution of approximately 168 dpi. The user may make contact with the multi touch-sensitive display 812 using any suitable object or appendage, such as a stylus, pen, finger, and so forth.

In some embodiments, in addition to the touch screen, the device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the multi touch-sensitive display 812 or an extension of the touch-sensitive surface formed by the multi touch-sensitive display 812.

The device 800 also includes a power system 838 for powering the various hardware components. The power system 838 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 816, the one or more processors 818, and the memory controller 820 may be implemented on a single chip, such as the processing system 804. In some other embodiments, they may be implemented on separate chips.

Multi-Touch Display System Architecture Overview

Figure 9:
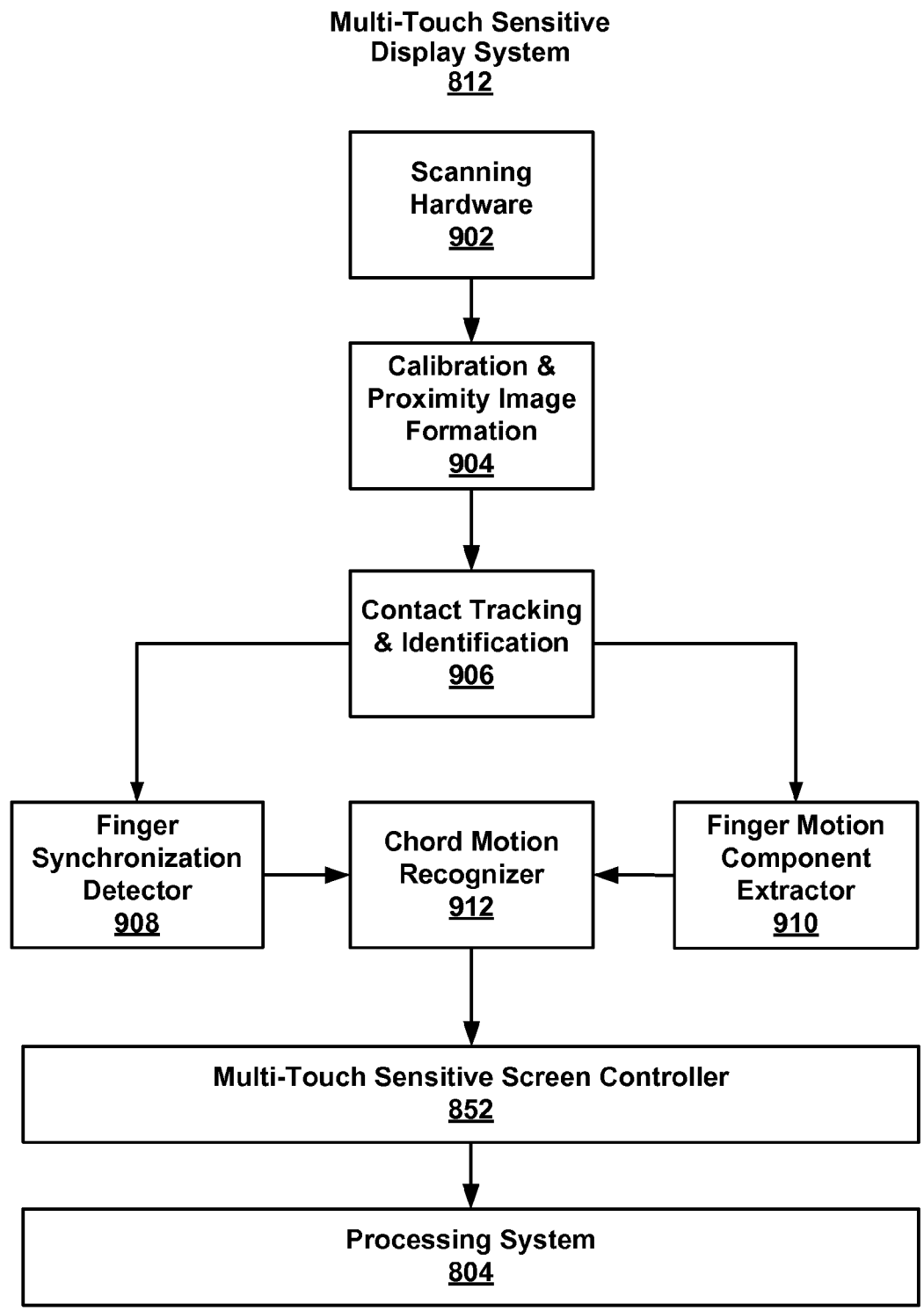
FIG. 9 is a block diagram of one embodiment of multi-touch-sensitive display system architecture.

FIG. 9 is a block diagram of one embodiment of multi-touch-sensitive display system architecture 812. The display system 812 generally includes scanning hardware 902, a calibration and proximity image formation module 904, a contact tracking and identification module 906, a finger synchronization detector module 908, a finger motion component extractor module 910 and a chord motion recognizer 912. Note that the display system 812 could have more or fewer components or a different configuration of components based on design choice.

Sensors embedded in the display surface of the display system 812 detect proximity of fingertips, thumbs and other conductive touch devices to the display surface. In some embodiments, the display surface is sized to provide room for finger gestures when embedded in a portable electronic device 800. The electronic scanning hardware 902 controls and reads from each proximity sensor of a sensor array under the display surface of the display system 812. The calibration module 904 constructs a raw proximity image from a complete scan of the sensor array and subtracts off any background sensor offsets. The background sensor offsets can simply be a proximity image taken when nothing is touching the display surface. The offset-corrected proximity image is then passed on to the contact tracking and identification module 906, which segments the image into distinguishable finger-surface contacts, tracks and identifies them as they move through successive images. The paths of identified contacts are passed on to the finger synchronization detection module 908 and a motion component extraction module 910, which contain software algorithms to distinguish finger configurations and respond to detected finger motions.

The finger synchronization detector 908 checks the finger activity within a hand for simultaneous presses or releases of a subset of fingers. When such simultaneous activity is detected it passes on the combination of finger identities in the synchronous subset to the chord motion recognizer 912.

The finger motion component extraction module 910 computes multiple degrees of freedom of control from individual finger motions during easily performable hand manipulations on the display surface, such as hand translations, hand rotation about the wrist, hand scaling by grasping with the fingers, and differential hand tilting.

The chord motion recognizer 912 produces chord tap or motion events dependent upon both the synchronized finger subset identified by the synchronization detector 908 and on the direction and speed of motion extracted by the finger motion component extractor module 910. These events are then posted to the multi-touch sensitive screen controller 852.

In some embodiments, the controller 852 is a communication interface that keeps events received from the chord motion recognizer 912 in a temporally ordered queue and dispatches them to the processing system 804. The method of communication between the controller/interface 852 and the processing system 804 can vary widely depending on the function and processing power of the processing system 804. In some embodiments, the modules 906, 908, 910 and 912 are implemented in software and run one or more processors 818 within the processing system 804. In such an embodiment, the display system 812 would include hardware to scan the proximity sensor array (module 902), form proximity images (module 904), and compress and send them to the processor 804 via the controller/interface 852. The interface 832 conveys results of the proximity image recognition process as input to applications 830 residing on the portable electronic device 800.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    detecting at least two first contacts on a display surface of a multi-touch-sensitive display device;
    detecting a first motion associated with the at least two first contacts, wherein the first motion corresponds to a multi-touch gesture;
    adjusting a parameter of a graphical object in accordance with the first motion;
    detecting a breaking of the at least two first contacts;
    after detecting the breaking of the at least two first contacts, detecting at least two second contacts on the display surface;
    detecting a second motion associated with the at least two second contacts, wherein the second motion corresponds to the multi-touch gesture and the at least two second contacts are detected within a pre-determined time interval after the breaking of the at least two first contacts is detected; and
    continuing to adjust the parameter of the graphical object in accordance with the second motion.

2. The method of claim 1, wherein adjusting the parameter is a non-linear function of a displacement of the first contacts during the multi-touch gesture.

3. The method of claim 1, wherein the parameter comprises a magnification of the graphical object.

4. The method of claim 1, wherein the parameter comprises an orientation of the graphical object.

5. The method of claim 1, wherein the multi-touch gesture comprises rotation.

6. The method of claim 1, wherein the multi-touch gesture comprises de-pinching, and wherein de-pinching includes displacing at least two contacts away from one another.

7. The method of claim 1, wherein the graphical object has a resolution that is less than a pre-determined threshold when the operation is performed on the object, and the graphical object has a resolution that is greater than the pre-determined threshold at other times.

8. A method, comprising:
    detecting at least two contacts on a display surface of a multi-touch-sensitive display device;
    displaying a graphical object proximate to a point of contact on the display surface;
    detecting motion associated with the at least two contacts;
    adjusting a parameter of the graphical object based on the motion associated with the at least two contacts;
    detecting a loss of contact on the display surface;
    responsive to detection of the lost contact, storing a current value of the parameter and starting a timer;
    responsive to the timer exceeding a threshold before contact is reestablished, ceasing to display the graphical object on the display;
    responsive to contact being reestablished before the timer exceeds the threshold, maintaining display of the graphical object on the display;
    while maintaining display of the graphical object on the display, detecting additional motion of the at least two contacts; and
    continuing to adjust the parameter based on the additional motion of the at least two contacts.

9. The method of claim 8, wherein the graphical object is animated to simulate motion.

10. The method of claim 8, wherein the parameter is volume control.

11. A computer-readable storage medium having stored thereon instructions which, when executed by one or more processors in a portable electronic device, cause the one or more processors to perform the operations of:
- detecting at least two contacts on a display surface of a multi-touch-sensitive display;
- displaying a graphical object proximate to a point of contact on the display surface;
- detecting motion associated with the at least two contacts;
- adjusting a parameter of the graphical object based on the motion associated with the at least two contacts;
- detecting a loss of contact with the display surface;
- responsive to detection of the lost contact, storing a current value of the parameter and starting a timer;
- responsive to the timer exceeding a threshold before contact is reestablished, ceasing to display the graphical object on the display;
- responsive to contact being reestablished before the timer exceeds the threshold, maintaining display of the graphical object on the display;
- while maintaining display of the graphical object on the display, detecting additional motion of the at least two contacts; and
- continuing to adjust the parameter based on the additional motion of the at least two contacts.

12. A portable electronic device, comprising:
a multi-touch-sensitive display;
one or more processors;
memory; and
one or more programs, wherein the one or more programs are stored in the memory and configured to be executed by the one or more processors, the one or more programs including instructions for:
- detecting at least two contacts on a display surface of the multi-touch-sensitive display;
- displaying a graphical object proximate to a point of contact on the display surface;
- detecting motion associated with the at least two contacts;
- adjusting a parameter of the graphical object based on the motion associated with the at least two contacts;
- detecting a loss of contact on the display surface;
- responsive to detection of the lost contact, storing a current value of the parameter and starting a timer;
- responsive to the timer exceeding a threshold before contact is reestablished, ceasing to display the graphical object on the display;
- responsive to contact being reestablished before the timer exceeds the threshold, maintaining display of the graphical object on the display;
- while maintaining display of the graphical object on the display, detecting additional motion of the at least two contacts; and
- continuing to adjust the parameter based on the additional motion of the at least two contacts.

13. A portable electronic device, comprising:
a multi-touch-sensitive display;
one or more processors;
memory; and
one or more programs, wherein the one or more programs are stored in the memory and configured to be executed by the one or more processors, the one or more programs including instructions for:
- detecting at least two first contacts on a display surface of the multi-touch-sensitive display;
- detecting a first motion associated with the at least two first contacts, wherein the first motion corresponds to a multi-touch gesture;
- adjusting a parameter of a graphical object in accordance with the first motion;
- detecting a breaking of the at least two first contacts;
- after detecting the breaking of the at least two first contacts, detecting at least two second contacts on the display surface;
- detecting a second motion associated with the at least two second contacts, wherein the second motion corresponds to the multi-touch gesture and the at least two second contacts are detected within a pre-determined time interval after the breaking of the at least two first contacts is detected; and
- continuing to adjust the parameter of the graphical object in accordance with the second motion.

14. A computer-readable storage medium having stored thereon instructions which, when executed by one or more processors in a portable electronic device, cause the one or more processors to perform the operations of:
- detecting at least two first contacts on a display surface of a multi-touch-sensitive display device;
- detecting a first motion associated with the at least two first contacts, wherein the first motion corresponds to a multi-touch gesture;
- adjusting a parameter of a graphical object in accordance with the first motion;
- detecting a breaking of the at least two first contacts;
- after detecting the breaking of the at least two first contacts, detecting at least two second contacts on the display surface;
- detecting a second motion associated with the at least two second contacts, wherein the second motion corresponds to the multi-touch gesture and the at least two second contacts are detected within a pre-determined time interval after the breaking of the at least two first contacts is detected; and
- continuing to adjust the parameter of the graphical object in accordance with the second motion.

* * * * *